UNITED STATES PATENT OFFICE.

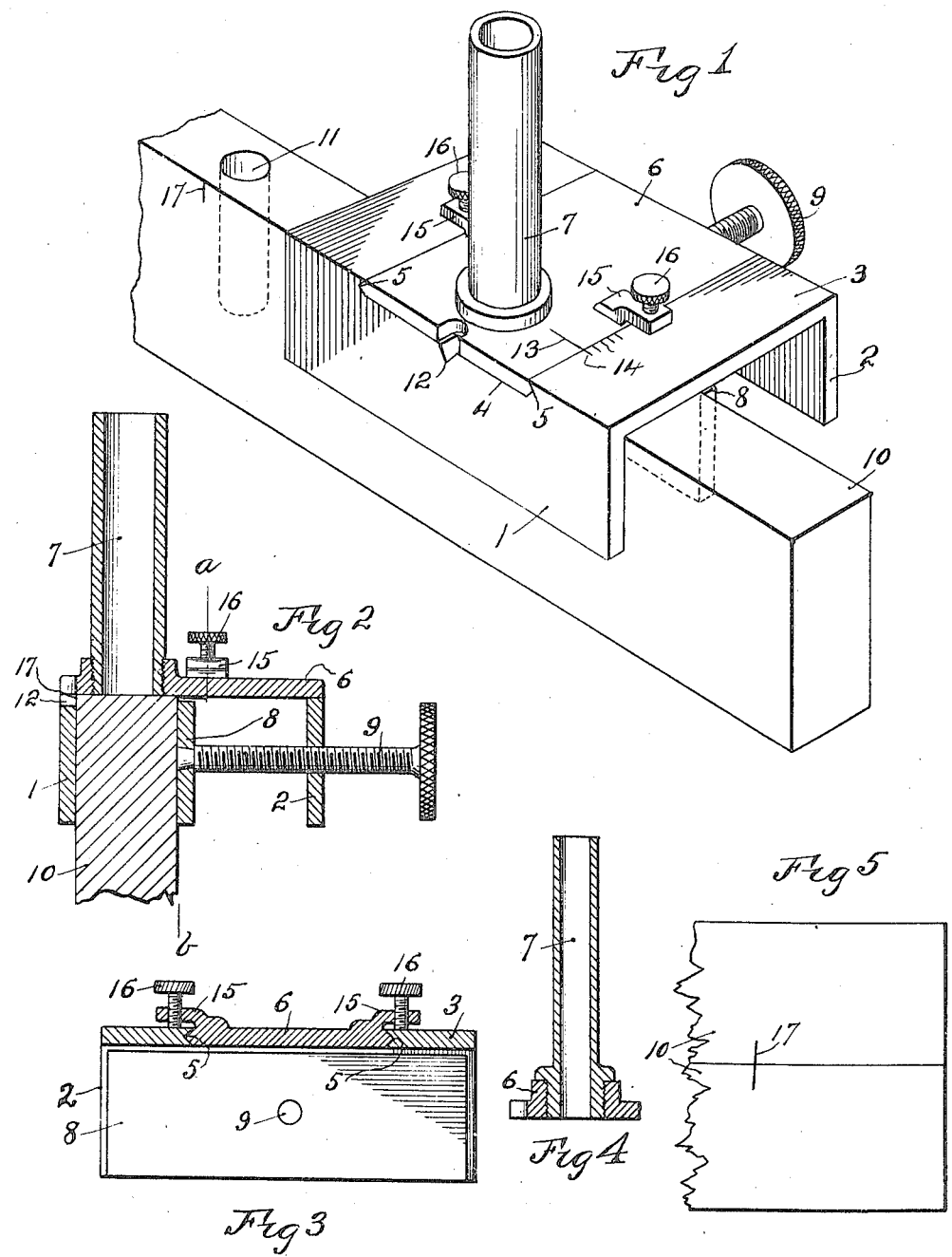

JOSEPH J. KELLEY, OF KANSAS CITY, MISSOURI.

BORING-TOOL-GUIDING APPARATUS.

1,161,479.

Specification of Letters Patent. Patented Nov. 23, 1915.

Application filed January 2, 1912. Serial No. 668,827.

*To all whom it may concern:*

Be it known that I, JOSEPH J. KELLEY, a citizen of the United States, and a resident of Kansas City, in the county of Jackson and State of Missouri, have invented certain new and useful Improvements in Boring-Tool-Guiding Apparatus, of which the following is a specification.

My invention relates to improvements in boring tool guiding apparatus.

The object of my invention is to provide an apparatus by which boring tools, such as bits or drills, may be easily and accurately held and guided in the operation of boring holes in the edges of boards for the reception of dowel pins.

A further object of my invention is to provide novel means by which the apparatus may be quickly and accurately positioned on the board which is to be bored.

A further object of my invention is to provide novel means by which the boring tool may be laterally adjusted to the proper position.

The novel features of my invention are hereinafter fully described and claimed.

In the accompanying drawings which illustrate the preferred form of my invention, Figure 1 is a perspective view of the apparatus shown mounted on the board which is to be bored. Fig. 2 is a central vertical cross section of what is shown in Fig. 1. Fig. 3 is a sectional view on the line *a—b* of Fig. 2. Fig. 4 is a detail sectional view of a portion of the slide plate having mounted therein a tubular guide of less diameter than the tubular guide shown in Fig. 2. Fig. 5 is a plan view showing two boards which are to be doweled together disposed edge to edge, a transverse mark extending across the adjacent edges of the boards for locating the positions of the dowel pin holes which are to coöperate with each other.

Similar reference characters designate similar parts in the different views.

I provide a support which is preferably U-shaped and which has two parallel arms 1 and 2 and a transverse portion 3 connecting said arms. The transverse portion 3 is provided with a transverse slot 4 which extends to the outer sides of the arms 1 and 2. The sides of the slot 4 are parallel with each other and are preferably provided with V-shaped guides 5 in which is slidably mounted a member comprising a plate 6 which is provided with a vertical screw threaded hole in which is fitted the externally screw threaded lower end of a vertical tube 7, which serves as a guide for and is adapted to receive therethrough a boring tool, such as a bit or drill, not shown.

Between the arms 1 and 2 and parallel therewith is a clamping member 8 provided with a transverse hole in which is rotatively mounted one end of a horizontal screw 9, which extends through and is fitted in a transverse screw threaded hole provided in the arm 2. By turning the screw 9 in the proper directions, the clamping plate or member 8 may be adjusted laterally toward and from the arm 1. The arm 1 and the member 8 are adapted to clamp between them the board 10 in the upper edge of which are to be bored holes for receiving dowel pins. One of these holes is shown in Fig. 1, and is indicated by 11.

Indicating means comprising preferably a V-shaped notch 12 is provided in the upper part of the arm 1 between the guides 5.

The notch 12 is preferably located in a vertical plane which includes the axis of the tubular guide 7 and which is parallel with the guides 5. The plate 6 on its upper side may be provided with an indicating mark 13 disposed parallel with the sides of the arms 1 and 2 and adapted to coöperate with graduations 14, a row of which is provided on the upper side of the transverse portion 3 of the U-shaped support.

The upper side of the plate 6 is provided with one or more ears 15 each provided with a vertical screw threaded hole in which is fitted a clamping screw 16 which is adapted to bear against the upper side of the portion 3 for securing the plate 6 in the position to which it may be adjusted.

In operating my invention, two boards which are to be doweled together, are placed edge to edge, as shown in Fig. 5. A mark 17 is then drawn across the adjacent edges of the two boards at the place where it is designed to bore a hole for a dowel pin. In this manner the location of the different holes may be indicated. The U-shaped support is then mounted on the board which is to be bored, the arm 1 being placed against one side of the board and the screw 9 turned so as to force the clamping member 8 against the other side of the board, the U-shaped support having first been positioned so that the notch 12 will aline with one of the indicating marks 17. The plate 6 is then adjusted laterally to a position in which the guiding tube 7 is disposed in the proper position between the two sides of the board, the indicating mark 13 being caused to register with the proper graduation 14. The graduations 14 may be located so as to indicate respectively the middle points of boards of different thicknesses. The screws 16 are then tightened, thereby securing the plate 6 and tubular guide 7 in the positions to which they have been adjusted. The boring tool, not shown, is then inserted in the tube 7 after which the hole is bored. Preferably the inner diameter of the tube 7 is slightly larger than the diameter of the boring tool employed. For different sized boring tools different sized tubes 7 may be employed, it merely being necessary that the threaded portion of the tubular guide used shall fit the threaded hole in the plate 6. After the hole has been bored, the screw 9 may be loosened and the U-shaped support slid along the board to a position in which the notch 12 will aline with another of the marks 17, after which the screw 9 is tightened and the boring tool again employed to bore the next hole.

I do not limit my invention to the specific structure shown and described, as modifications within the scope of the appended claim, may be made without departing from the spirit of my invention.

Having thus described my invention, what I claim and desire to secure by Letters Patent, is:—

In a boring tool guiding apparatus, a U-shaped support provided in its transverse portion with two parallel transverse guides, one of the arms of said support being provided adjacent to said transverse portion with a V-shaped notch extending through the arm, a member slidably mounted in said guides and provided with a hole therethrough, a tubular guide fitted in said hole and having its center disposed the same distance from said guides as the center of the V-shaped notch, and adjustable clamping means carried by the other arm of said support and adapted to coöperate with the first named arm.

In testimony whereof I have signed my name to this specification in the presence of two subscribing witnesses.

JOSEPH J. KELLEY.

Witnesses:
WARREN D. HOUSE,
F. B. HOUSE.